US009371783B2

(12) United States Patent
Surnilla et al.

(10) Patent No.: US 9,371,783 B2
(45) Date of Patent: Jun. 21, 2016

(54) METHOD AND SYSTEM FOR IMPROVED DILUTION TOLERANCE

(71) Applicant: Ford Global Technologies, LLC, Dearborn, MI (US)

(72) Inventors: Gopichandra Surnilla, West Bloomfield, MI (US); James Alfred Hilditch, Canton, MI (US); Jeffrey Allen Doering, Canton, MI (US); Adam Nathan Banker, Canton, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 14/075,986

(22) Filed: Nov. 8, 2013

(65) Prior Publication Data
US 2015/0128917 A1    May 14, 2015

(51) Int. Cl.
*F02M 25/07* (2006.01)
*F02D 13/06* (2006.01)
*F02D 21/08* (2006.01)
*F02D 41/12* (2006.01)
*F02D 41/00* (2006.01)

(52) U.S. Cl.
CPC ............... *F02D 13/06* (2013.01); *F02D 21/08* (2013.01); *F02D 41/005* (2013.01); *F02D 41/0087* (2013.01); *F02D 41/12* (2013.01); *F02D 41/0082* (2013.01); *F02D 41/123* (2013.01); *F02M 26/46* (2016.02); *Y02T 10/18* (2013.01); *Y02T 10/47* (2013.01)

(58) Field of Classification Search
CPC ....... F02D 13/06; F02D 21/08; F02D 41/005; F02D 41/0082; F02D 41/0087; F02D 41/12; F02D 41/123; F02D 17/02
USPC ..................... 123/568.16, 217, 481
See application file for complete search history.

(56) References Cited

U.S. PATENT DOCUMENTS 4,144,864 A * 3/1979 Kato .................. F02D 41/0087
                                              123/198 F
5,503,129 A * 4/1996 Robichaux .......... F02D 41/0087
                                              123/481

(Continued)

FOREIGN PATENT DOCUMENTS

DE         3814484 A1 * 11/1988 .............. F02D 13/06

OTHER PUBLICATIONS

Styles, Daniel Joseph et al., "Method and System for Improved Dilution Purging," U.S. Appl. No. 14/085,676, filed Nov. 20, 2013, 55 pages.

(Continued)

*Primary Examiner* — Thomas Moulis
*Assistant Examiner* — Joshua A Campbell
(74) *Attorney, Agent, or Firm* — Julia Voutyras; Alleman Hall McCoy Russell & Tuttle LLP

(57) ABSTRACT

Methods and systems are provided for expediting purging of LP-EGR from an air intake system during conditions of decreasing engine load. During a tip-out, an EGR valve is closed while the engine is shifted to a VDE mode of operation to improve engine tolerance to EGR at lower engine loads and until the EGR is sufficiently purged. A non-VDE mode is resumed if higher engine loads are restored, else, a deceleration fuel shut-off mode is selected if the tip-out continues to zero load.

20 Claims, 7 Drawing Sheets

(56) References Cited

U.S. PATENT DOCUMENTS

| | | | |
|---|---|---|---|
| 5,934,263 A * | 8/1999 | Russ | F01L 1/34 123/568.14 |
| 6,619,267 B1 | 9/2003 | Pao | |
| 7,797,929 B2 * | 9/2010 | Elwart | F01N 3/0814 60/273 |
| 7,934,486 B1 * | 5/2011 | Styles | F01N 3/2066 123/406.23 |
| 8,607,544 B2 | 12/2013 | Uhrich et al. | |
| 2007/0246028 A1 | 10/2007 | Fujita et al. | |
| 2010/0242582 A1 * | 9/2010 | Wang | F02D 41/0082 73/114.62 |
| 2011/0239997 A1 * | 10/2011 | Surnilla | F01N 3/2066 123/568.21 |
| 2011/0265454 A1 | 11/2011 | Smith et al. | |
| 2011/0265771 A1 | 11/2011 | Banker et al. | |
| 2012/0023937 A1 | 2/2012 | Styles et al. | |
| 2012/0037134 A1 * | 2/2012 | Jankovic | F02D 41/0002 123/568.21 |
| 2012/0285161 A1 | 11/2012 | Kerns et al. | |
| 2015/0128917 A1 * | 5/2015 | Surnilla et al. | 123/568.16 |

OTHER PUBLICATIONS

Styles, Daniel Joseph et al., "Method and System for Improved Dilution Purging," U.S. Appl. No. 14/085,696, filed Nov. 20, 2013, 55 pages.

* cited by examiner

METHOD AND SYSTEM FOR IMPROVED DILUTION TOLERANCE

TECHNICAL FIELD

The present application relates to methods and systems for improving exhaust gas recirculation dilution tolerance of an engine during operation at light loads.

BACKGROUND AND SUMMARY

Exhaust gas recirculation (EGR) systems recirculate a portion of exhaust gas from an engine exhaust to an engine intake system to improve fuel economy and vehicle emissions by reducing throttling losses and combustion temperatures. In turbo-charged direct injection engines, a low-pressure EGR (LP-EGR) circuit may be implemented. The LP-EGR circuit recirculates exhaust gases from an exhaust passage downstream of a turbine to an intake passage upstream of a turbocharger compressor.

In order to provide EGR over a wide-range of operating conditions, LP-EGR systems may utilize a specialized EGR schedule. One example EGR schedule is shown by Fujita et al. in US 20070246028. Therein, a fixed amount of EGR is delivered at all EGR conditions, the EGR amount delivered as one or more of low pressure EGR and high pressure EGR. Another example schedule is shown by Styles et al. in US 20120023937. Therein, LP-EGR is delivered at a fixed EGR rate (or percentage) relative to fresh airflow at all engine loads except high loads.

However, the inventors herein have identified potential issues with such schedules. As an example, delivering EGR as per the schedules of Styles or Fujita may lead to combustion instability and engine misfire events during transient operations due to the presence of excess EGR dilution. This is largely due to the pre-compressor location of EGR delivery. Particularly, in turbo-charged systems, providing EGR though the LP-EGR circuit may cause long transport delays as the exhaust gases have to travel though the turbocharger compressor, high-pressure air induction plumbing, charge air cooler, and intake manifold before reaching the combustion chamber. As a result of the transport delay, during conditions when EGR needs to be rapidly reduced, such as during a tip-out operation where the engine goes from a high load and high EGR rate condition to a low load and low EGR rate condition, EGR may not be purged from the air intake system fast enough. As a result, there may be elevated intake-air EGR dilution during the low load condition until the EGR is purged from the air intake system. The presence of increased intake-air dilution at low loads can increase combustion stability issues and the propensity for engine misfires.

While the flat schedule of Styles may reduce the likelihood of high EGR amounts at lower engine loads, the schedule may also limit the fuel economy benefits of LP-EGR. For example, the flat EGR schedule may result in LP-EGR being provided at some low load points where no fuel economy benefits from EGR are achieved. In some cases, there may even be a fuel penalty associated with the delivery of LP-EGR at the low load point. As another example, the lower EGR at the lower load points may limit the peak EGR rates achievable during subsequent higher load engine operation. The delayed purging of EGR requiring EGR in the engine intake system at low engine loads can also render the intake compressor susceptible to corrosion and condensation. Furthermore, increased condensation may occur at the charge air cooler of a boosted engine system due to the flow of EGR through the cooler. The increased condensation may necessitate additional counter-condensation measures which further reduce engine efficiency and fuel economy.

In one example, some of the above issues can be at least partly addressed by a method for an engine comprising: operating an engine with all cylinders combusting while flowing low pressure EGR; and responsive to decreasing engine load, disabling EGR and operating the engine with one or more cylinders deactivated until EGR is below a threshold. In this way, the EGR tolerance of the engine at low loads is improved.

As an example, during medium to high engine loads, an engine may be operating with low pressure EGR (LP-EGR) flowing to provide fuel economy and emissions benefits. The LP-EGR flow may be adjusted to be at a fixed rate relative to airflow. In response to a decrease in engine load to low load conditions, such as due to an operator pedal tip-out, air flow may be decreased (e.g., by adjusting an intake throttle) while also decreasing LP-EGR flow (e.g., adjusting an LP-EGR valve). For example, an EGR valve may be adjusted to provide lower engine dilution at the lower load conditions. However, the purging of the EGR from the engine system may occur slower than desired due to transport delays in the LP-EGR system. Specifically, more EGR may be present in the air induction system, specifically at a pre-compressor location, than desired, degrading combustion stability and potentially inducing misfires.

In order to improve the low load engine combustion stability and EGR tolerance, in response to the decreasing engine load, while EGR is reduced, one or more cylinders may be selectively deactivated. For example, fuel to the one or more cylinders may be cut off while intake and exhaust valves are deactivated. A number of cylinders deactivated may be based on the decrease in engine load. In one example, the engine may have two banks of cylinders and in response to the decreasing engine load, all cylinders of a first engine bank may be deactivated while all cylinders of the second bank are maintained active. As a result, for the same engine torque, the cylinders of the second bank may be working at a higher average cylinder load. The higher load operation of the active cylinders allows for engine operation at the lingering EGR with reduced likelihood of misfires and slow burn issues. In addition, by isolating the air volume of the deactivated bank, the effective boosted volume of the engine is decreased, and LP-EGR depletion is expedited. The engine may continue to be operated with one or more cylinders deactivated until LP-EGR has been depleted to a threshold level. In response to a subsequent tip-in, the previously deactivated engine cylinders may be reactivated. In addition, during the reactivation, fueling may be adjusted so as to purge an exhaust catalyst coupled to the deactivated group of cylinders. As such, the fuel economy gain from the higher cylinder load operation and expedited EGR purging may balance or outweigh the fuel economy associated with the purging of the exhaust catalyst.

In this way, EGR purging from an engine intake can be expedited. By selectively deactivating one or more engine cylinders during decreasing engine load and decreasing EGR conditions, the average cylinder load can be increased, improving cylinder EGR tolerance and combustion stability. By isolating the air volume of the deactivated cylinders, the effective boosted volume of the engine is decreased and LP EGR depletion is expedited. As such, this enables EGR levels in the air induction system and intake manifold to be reduced faster (e.g., up to half the time) than would have been otherwise possible. By rapidly reducing the intake EGR level at low load conditions and by increasing EGR dilution tolerance at these low engine load conditions via cylinder deactivation, higher EGR rates can be achieved when the engine is subsequently restarted. As such, this substantially improves engine efficiency, particularly in medium to high engine speed-load regions. By replacing the EGR with fresh air, evaporation of water and hydrocarbon condensates is increased, reducing their concentration in the engine, and the need for counter-condensation measures. In addition, the reduction in condensation reduces compressor and charge air cooler corrosion and degradation. Overall, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for selectively deactivating one or more cylinders of an engine system (such as the engine system of FIGS. 1-3) to improve combustion EGR tolerance and expedite purging of EGR from the engine at low load conditions. While operating the engine with EGR flowing, in response to decreasing engine load, EGR delivery to the engine may need to be rapidly reduced. During such conditions, a controller may be configured to perform a control routine, such as the example routine of FIG. 4, to selectively deactivate fuel and the intake and exhaust valves to one or more engine cylinders, while operating the active cylinders at a higher average cylinder load. The engine may be operated with the one or more cylinders deactivated for a duration until EGR is sufficiently purged from the engine's intake manifold. In one example, the engine may be operated in a VDE mode with all cylinders of one engine bank deactivated until the EGR is sufficiently purged. Example adjustments are shown with reference to FIGS. 6-7. In this way, dilution tolerance of an engine at low engine loads is improved.

Figure 1:
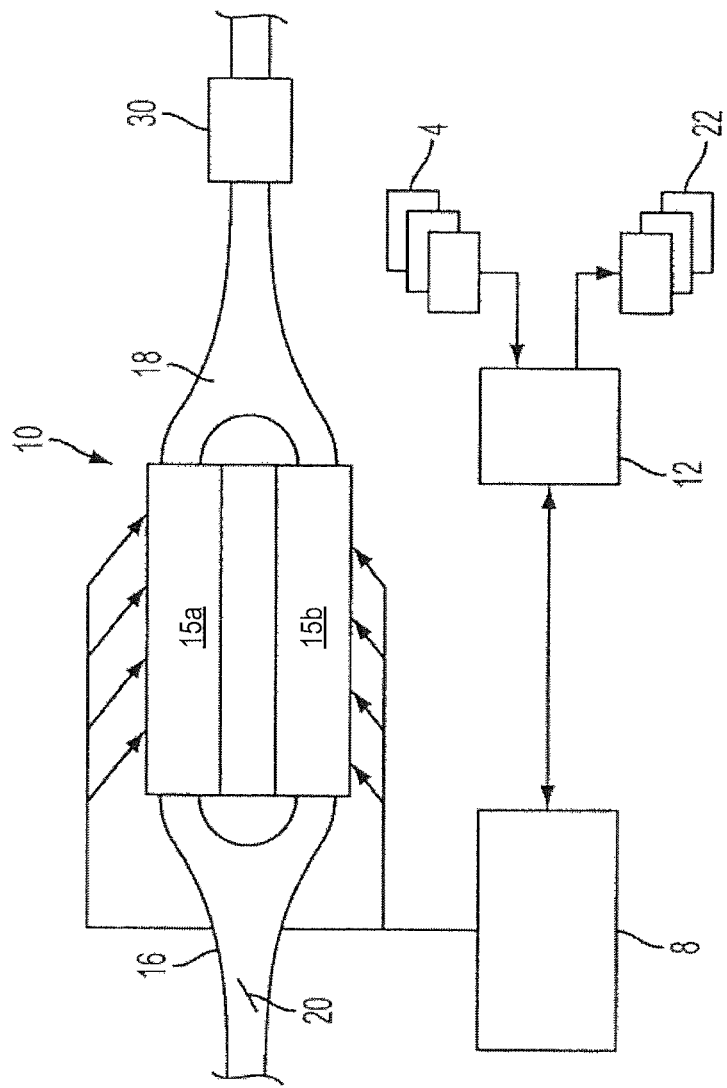
FIG. 1 shows an example engine and exhaust system layout.

FIG. 1 shows an example variable displacement engine (VDE) 10 having a first bank 15a and a second bank 15b. In the depicted example, engine 10 is a V6 engine with the first and second banks each having three cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

During selected conditions, such as when the full torque capability of the engine is not needed, one of a first or a second cylinder group may be selected for deactivation (herein also referred to as a VDE mode of operation). Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. In other words, the remaining active cylinders are operated at higher average cylinder loads. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

In alternate examples, engine system 10 may have cylinders with selectively deactivatable intake and/or exhaust valves. Therein, the cylinder valves may be selectively deactivated via hydraulically actuated lifters (e.g., lifters coupled to valve pushrods), or via a cam profile switching mechanism in which a cam lobe with no lift is used for deactivated valves.

Cylinders may be grouped for deactivation in a bank-specific manner. For example, in FIG. 1, the first group of cylinders may include the three cylinders of the first bank 15a while the second group of cylinders may include the three cylinders of the second bank 15b. In an alternate example, instead of one or more cylinders from each bank being deactivated together, two cylinders from each bank of the V8 engine may be selectively deactivated together.

Engine 10 may operate on a plurality of substances, which may be delivered via fuel system 8. Engine 10 may be controlled at least partially by a control system including controller 12. Controller 12 may receive various signals from sensors 4 coupled to engine 10 (described in further detail with reference to FIG. 2), and send control signals to various actuators 22 coupled to the engine and/or vehicle (as also described with reference to FIG. 2). The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Figure 2:
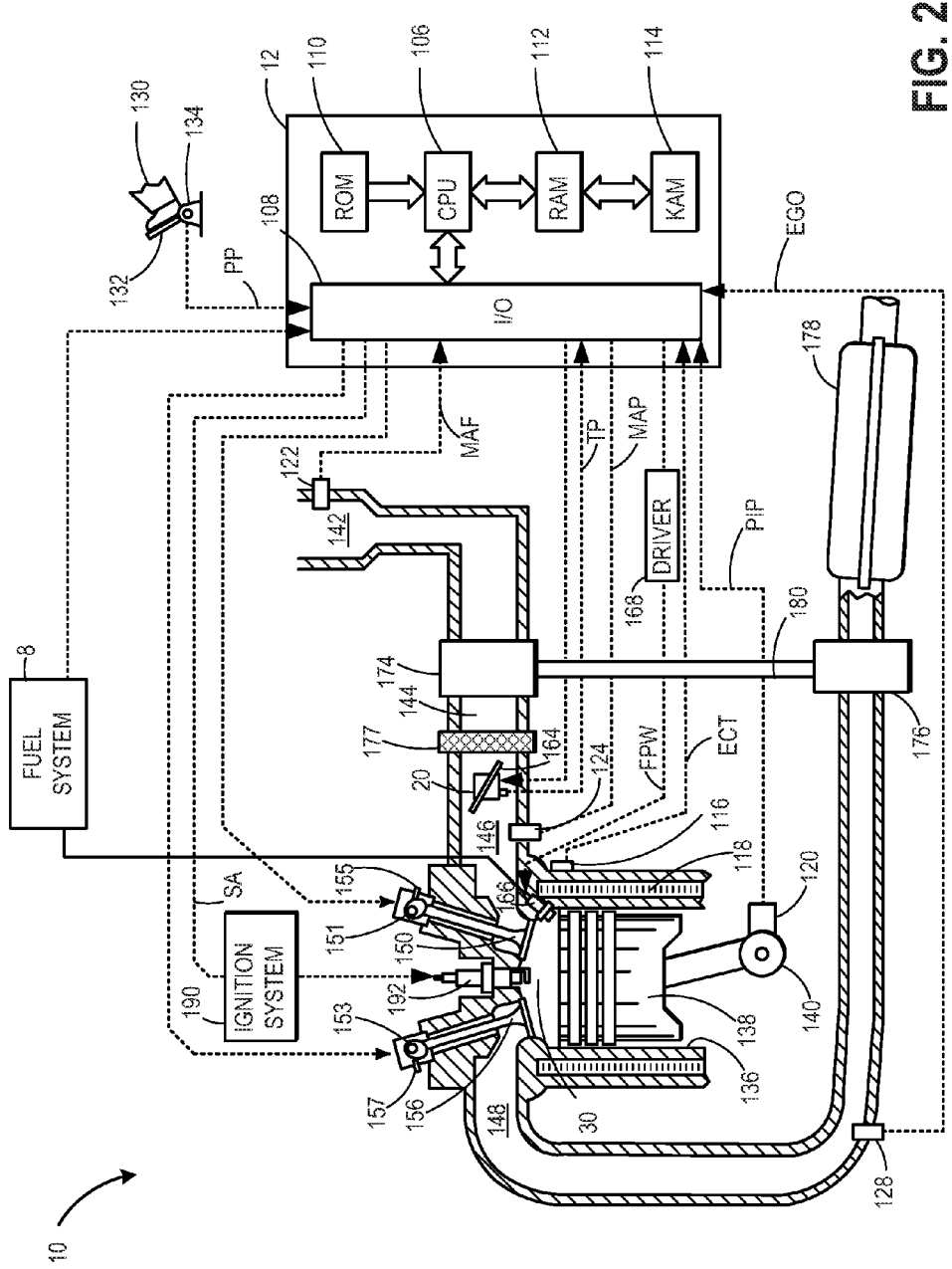
FIG. 2 shows a partial engine view.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A charge air cooler (CAC) 177 may be positioned in intake air passage 144, downstream of compressor 174, for cooling the boosted aircharge prior to delivery to the engine cylinders. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Further, in the disclosed embodiments, an EGR system may route a desired portion of exhaust gas from exhaust passage 148 to intake manifold 142. FIG. 2 shows Engine 10 may include an LP-EGR system (shown at FIG. 3) wherein LP-EGR is routed through LP-EGR passage from downstream of turbine 176 to upstream of compressor 174. The amount of LP-EGR provided to intake passage 144 may be varied by controller 12 via an LP-EGR valve. Likewise, there may be an HP-EGR system (shown at FIG. 3) wherein HP-EGR is routed through an HP-EGR passage from upstream of turbine 176 to downstream of compressor 174. The amount of HP-EGR provided to intake passage 144 may be varied by controller 12 via a dedicated HP-EGR valve. The HP-EGR system may include an HP-EGR cooler (see FIG. 3) and the LP-EGR system may include LP-EGR cooler to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages or induction passages 142 or 144 and may provide an indication of one or more of mass flow, pressure, temperature, concentration of O2, and concentration of the exhaust gas. In some embodiments, one or more sensors may be positioned within the LP-EGR passage or induction passages 142 or 144 to provide an indication of one or more of a flow rate, pressure, temperature, and concentration of O2 or another species to determine LP EGR flow rate and concentration relative to air flow rate. Exhaust gas diverted through the LP-EGR passage may be diluted with fresh intake air at a mixing point located at the junction of the LP-EGR passage and intake passage 142. Specifically, by adjusting the LP-EGR valve in coordination with a low pressure AIS throttle in duct 142, a dilution of the EGR flow may be adjusted.

A percent dilution of the LP-EGR flow may be inferred from the output of a sensor in the engine intake gas stream. Specifically, the sensor may be positioned downstream of the LP-EGR valve, such that the LP-EGR dilution may be accurately determined. The sensor may be, for example, a hot film or hot wire anemometer mass flow meter or a delta pressure orifice or venturi. Alternatively an oxygen sensor such as a UEGO sensor can be used in duct 144 to calculate LP EGR rate.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
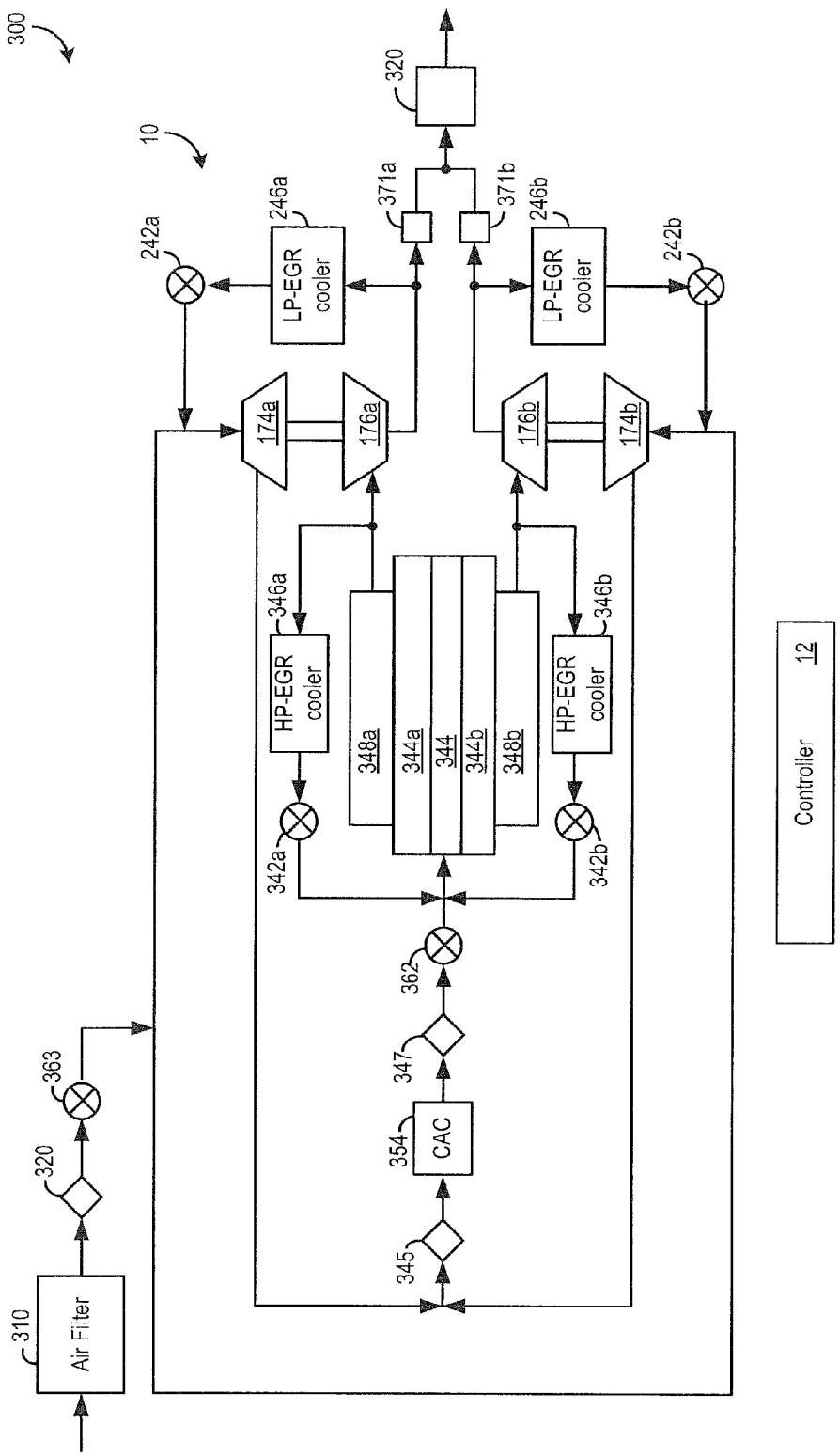
FIG. 3 depicts another example engine system configured with exhaust gas recirculation (EGR) capabilities.

Now turning to FIG. 3, an example embodiment 300 of an engine system 10 including a plurality of cylinder banks and an exhaust gas recirculation system is illustrated. In one embodiment, engine 10 may comprise a turbocharger including compressor 174 and turbine 176, throttle 363 upstream of compressor 174, and a low-pressure exhaust gas recirculation (LP-EGR) system. The LP-EGR system may route EGR from downstream of turbine 176 to upstream of compressor 174 and downstream of throttle 363. The engine system may further comprise a HP-EGR system which routes EGR from upstream of turbine 176 to downstream of throttle 362.

Turning to FIG. 3, air may enter engine 10 through an air filter 310. Air filter 310 may be configured to remove solid particulates from the air so a clean air mass may enter engine 10. The clean air mass flow may be measured as it flows past mass air flow sensor 320 and then through intake throttle 363. The clean air mass flow measured by mass air flow sensor 320 may be communicated to controller 12. In one embodiment, the clean air mass may be split between the different cylinder banks of engine 10 downstream of intake throttle 363 and upstream of turbocharger compressor 174. An EGR system may inject exhaust gas upstream of turbocharger compressor 174 so that a combination of clean air and exhaust gas can be compressed by turbocharger compressor 174. In one embodiment, turbocharger compressor 174 may include a first compressor 174a for a first cylinder bank and a second compressor 174b for a second cylinder bank.

The compressed combination of clean air and exhaust gas downstream of turbocharger compressor 174 may be cooled by a charge air cooler (CAC) 354 upstream of a second throttle 362. In one embodiment, the oxygen content of the airflow downstream from turbocharger compressor 174a-b may be measured by a sensor 345 upstream of CAC 354. In an alternate embodiment, the oxygen content of the airflow downstream from turbocharger compressor 174a-b may be measured by a sensor 347 downstream of CAC 354. Measurements from sensors 345 and/or 347 may be communicated to controller 12.

In one embodiment, high pressure exhaust gas may be combined with the compressed combination of clean air and exhaust gas downstream of throttle 362 and upstream of intake manifold 344. The combination of gases may be routed to one or more cylinder banks by intake manifold 344. For example, gases may be routed to a first cylinder bank 344a and a second cylinder bank 344b. After combustion in the cylinders, exhaust gas may be routed through exhaust passage 348. In one embodiment, exhaust passage 348 includes an exhaust manifold for each bank of cylinders, such as exhaust manifold 348a for a first cylinder bank and exhaust manifold 348b for a second cylinder bank.

During selected conditions, such as when the full torque capability of the engine is not needed, cylinders of one of first cylinder bank 344a and second cylinder bank 344b may be selected for deactivation (herein also referred to as a VDE mode of operation). Specifically, one or more cylinders of the selected cylinder bank may be deactivated by shutting off respective fuel injectors while maintaining operation of the intake and exhaust valves such that air may continue to be pumped through the cylinders. Alternatively, the intake and exhaust valves on the deactivated cylinders can also be disabled to prevent air from being pumped through these cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled by operating the active cylinders at higher average cylinder loads, allowing for increased engine efficiency. As also elaborated at FIG. 4, during conditions of decreasing load, cylinders of one of bank 344a and 344b may be deactivated, EGR may be disabled, and the engine may be operated in the VDE mode until EGR is sufficiently purged from the air induction system. Thereafter, based on the engine load, the engine may resume operation in a non-VDE mode by reactivating the cylinders.

At least a portion of the exhaust gasses may drive a turbine 176 of the turbocharger. In one embodiment, turbine 176 may include a first turbine 176a for a first cylinder bank and a second turbine 176b for a second cylinder bank. In one embodiment, at least a portion of the exhaust gasses may be routed through an HP-EGR system. For example, an HP-EGR system may include HP-EGR cooler 346 and valve 342 for routing cooled exhaust gasses upstream of intake manifold 344. In one embodiment, a HP-EGR system may include a first HP-EGR cooler 346a and valve 342a for a first cylinder bank and a second HP-EGR cooler 346b and valve 342b for a second cylinder bank.

Downstream from turbine 176a-b, at least a portion of the exhaust gasses may flow downstream through emission control device 371 and muffler 320. In one embodiment, emission control device 371 may include a first light-off catalyst or three-way catalyst (TWC) 371a for a first cylinder bank and a second light-off catalyst or three-way catalyst 371b for a second cylinder bank. Muffler 320 may be configured to dampen exhaust noise from engine 10.

At least a portion of the exhaust gasses from downstream of turbine 176a-b may be routed upstream of turbocharger compressor 174a-b by an LP-EGR system. For example, an LP-EGR system may include LP-EGR cooler 246 and valve 242 for routing cooled exhaust gasses upstream of compressor 174. In one embodiment, an LP-EGR system may include a first LP-EGR cooler 246a and valve 242a for a first cylinder bank and a second LP-EGR cooler 246b and valve 242b for a second cylinder bank.

An amount of LP-EGR delivered may be adjusted based on engine speed-load conditions. For example, delivery of LP-EGR at mid to high load conditions allows for improved fuel economy and exhaust emissions. In one example, at all loads down from a mid-load, LP-EGR may be delivered according to a flat schedule wherein the EGR rate is kept constant relative to airflow. This may require the opening of LP-EGR valves 242a and 242b to be coordinated with the opening of intake throttle 363. Thus, during increasing loads, such as during a tip-in, as airflow is increased, LP-EGR delivery may be correspondingly increased. Likewise, during decreasing loads, such as during a tip-out, as airflow is decreased, LP-EGR delivery may be correspondingly decreased.

However, due to a large transport delay between the LP-EGR valve and the combustion chamber, EGR may not be decreased as fast as required, in particular in the air induction system from the EGR outlet to the compressor inlet (on each bank). Specifically, since the LP-EGR passage takes off exhaust gas after the turbine and injects exhaust gas before the compressor, there is a large delay in purging of the EGR from the air intake system, which in turn leads to combustion stability risks.

Figure 5:
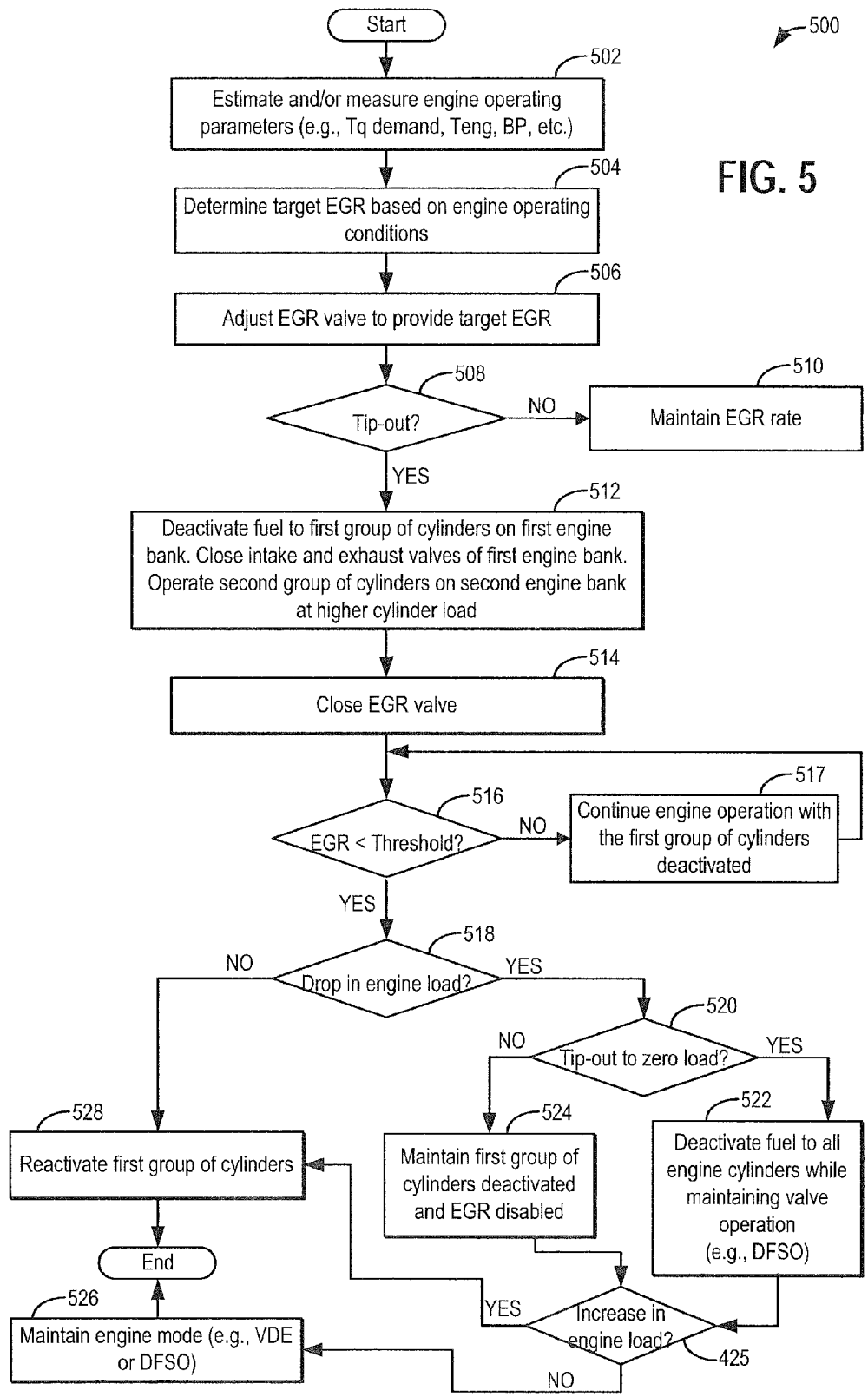
FIG. 5 illustrates an example method for operating a first engine bank in a VDE mode while operating a remaining engine bank in a non-VDE mode to expedite LP-EGR purging from the engine.

As elaborated here at FIG. 5, during low load conditions where EGR dilution is higher than desired, such as due to delays in EGR purging, dilution tolerance is improved by deactivating cylinders of one engine bank while operating the engine in a VDE mode until EGR is sufficiently purged. The higher average cylinder load increases the cylinder's dilution tolerance and reduces the combustion stability risk. For example, cylinder bank 344a may be deactivated while cylinder bank 344b continues to operate. As such, during the VDE mode, exhaust catalyst 371a coupled downstream of the deactivated bank 344a may become oxygen saturated and catalytically inefficient. Thus, during cylinder reactivation, when exiting the VDE mode, fueling to cylinder bank 344a may be adjusted so that exhaust catalyst 371a can be purged and catalytic efficiency improved. For example, during cylinder reactivation, cylinder bank 344a may be operated richer than stoichiometry for a duration until exhaust catalyst 371a has been purged while cylinder bank 344b is operated at stoichiometry.

In addition, the reduced effective boosted volume at the deactivated bank (if intake and exhaust valves are deactivated) expedites the replacement of EGR in the air induction system with fresh air when VDE mode is activated, further improving the ability of VDE to achieve higher EGR rates at medium and higher loads while purging the LP EGR at lower engine loads.

Figure 4:
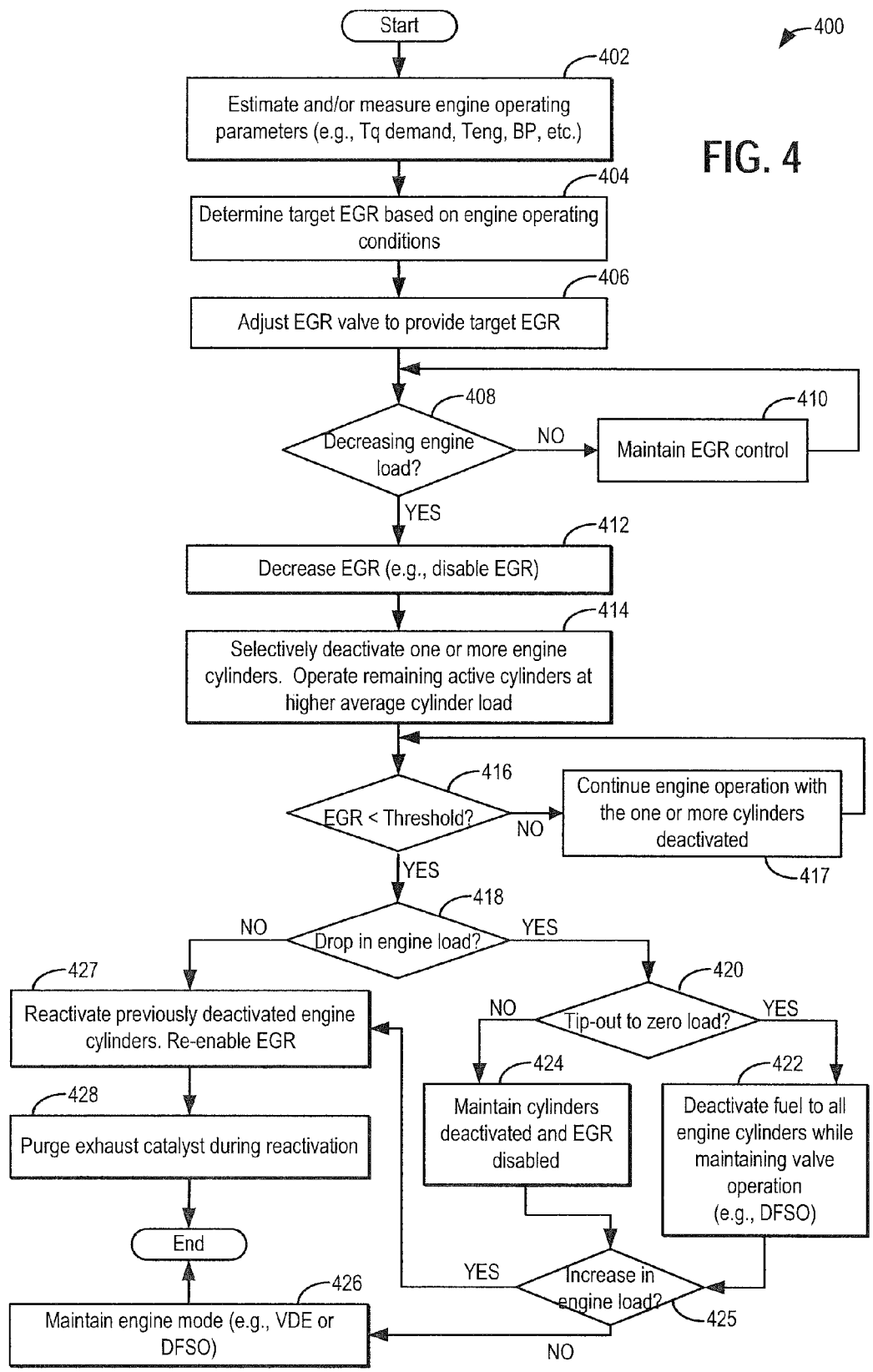
FIG. 4 illustrates an example method for operating an engine with one or more cylinders deactivated to expedite purging of LP-EGR.

Now turning to FIG. 4, an example routine 400 is shown for selectively deactivating one or more engine cylinders during decreasing engine load conditions so as to improve combustion EGR tolerance and expedite low pressure EGR purging from an engine intake.

At 402, the routine includes estimating and/or measuring engine operating conditions. These may include, for example, engine speed, torque demand, engine temperature, ambient conditions (such as ambient temperature, barometric pressure, and ambient humidity), etc. At 404, based on the estimated operating conditions, a target EGR rate may be determined. The target EGR rate may include a target rate of high pressure EGR (HP-EGR), low pressure-EGR (LP-EGR), or a combination of high and low pressure EGR. In one example, based on the engine operating conditions, such as the engine speed-load conditions, the engine may be operating boosted with fuel delivered to the boosted engine via direct injection. In addition, the engine may be operating with LP-EGR flowing. By flowing LP-EGR during engine operation, fuel economy is improved via pumping work reduction, knock mitigation, combustion efficiency improvement, and enrichment reduction.

In one example, the LP-EGR rate and schedule may be a flat schedule wherein LP-EGR is delivered at a fixed rate relative to airflow. The LP-EGR includes cooled exhaust residuals recirculated from an engine exhaust manifold, downstream of an exhaust turbine, to an engine intake manifold, upstream of an intake compressor.

As such, the amount of EGR (HP-EGR, LP-EGR, or a combination of the two) delivered to the intake may be based on an engine-speed load map stored in the memory of controller 12. In one example, the engine speed-load map may include at least two LP-EGR operating modes, including a fixed and a variable operating mode. The fixed mode range may comprise all engine loads from higher loads down to minimum load, and/or engine speeds lower than a threshold, such as at or below 3500 RPM. At very high engine loads and speeds up to full engine load, LP-EGR may be reduced to avoid excessive heat transfer or engine performance limitations. Minimum engine load as used herein comprises the lowest possible load allowable for current operating conditions, e.g. the lowest load that sustains combustion for current engine speed, temperature, etc., and may correspond to a closed throttle engine load for current engine speed conditions. In some conditions, the minimum load may be lower than the load at idle. Thus, the minimum load may be encountered during non-idle conditions and may include the most challenging operating point for avoiding engine misfire during an engine tip-out with a fixed EGR schedule, the fixed EGR scheduled required during tip-out conditions by the large transport delays and boosted volumes inherent to LP EGR. In comparison, the variable EGR mode may be enabled to allow higher EGR rates in the mid and higher engine load ranges for improved fuel economy benefit, with reduced EGR rates in other areas of the engine map, such as lower loads, to avoid engine misfire or combustion stability issues due to high dilution levels.

At 406, the routine includes adjusting a position of the EGR valve to flow EGR at the determined target EGR rate and schedule. For example, the opening of an LP-EGR valve in an LP-EGR passage and/or the opening of an HP-EGR valve in an HP-EGR passage may be adjusted. In some embodiments, the opening of the EGR valve may be adjusted based on the target EGR rate relative to a current EGR estimate. EGR may be estimated using one or more sensors coupled to the EGR passage. Alternatively, LP-EGR may be estimated based on the output of an intake oxygen sensor coupled downstream of the compressor and upstream of an intake throttle. A controller may infer the current EGR dilution based on a change (e.g., decrease) in oxygen concentration at the sensor.

At 408, it may be determined if there is decreasing engine load. For example, it may be determined if the engine load has been decreased to below a threshold load. In one example, the decreasing engine load is responsive to an operator pedal tip-out from medium or high load to low load conditions. If there is no decrease in engine load, EGR control may be maintained at 410. This includes adjusting the EGR rate based on engine operating conditions so as to continue to provide LP-EGR at a desired rate relative to engine speed/load conditions.

At 412, while operating the engine with all cylinders combusting and while flowing low pressure EGR, responsive to the decreasing engine load, EGR may be decreased. This may include decreasing LP-EGR while maintaining LP-EGR at a fixed rate relative to intake airflow so as to provide or maintain a flat LP-EGR schedule at the lower load. In another example, decreasing EGR includes disabling EGR, for example, by closing an LP-EGR valve in an LP-EGR passage, the LP-EGR passage delivering exhaust residuals from an exhaust manifold, downstream of an exhaust turbine, to an intake manifold, upstream of an intake compressor. Disabling EGR may alternatively include closing an HP-EGR valve in an HP-EGR passage.

Also responsive to the decreasing engine load, at 414, the routine includes selectively deactivating one or more engine cylinders and operating the engine with the one or more cylinders deactivated until EGR is below a threshold. Operating the one or more cylinders deactivated includes selectively disabling or deactivating fuel to the one or more cylinders. For example, the cylinders may be configured with selectively deactivatable fuel injectors and disabling fuel to the cylinders may include disabling fuel injectors of the one or more cylinders while maintaining intake and exhaust valve operation so that air continues to be pumped through the deactivated cylinders. In another example, the cylinders may be configured with selectively deactivatable intake and/or exhaust valves and disabling the cylinders may include deactivating the intake and/or exhaust valve of the one or more cylinders so that air is not pumped through the deactivated cylinders. As such, by deactivating one or more cylinders, the remaining active cylinders may need to be operated at a higher average cylinder load to maintain engine torque output.

A number of cylinders that are deactivated responsive to the decreasing engine load is variable and depends on various factors such as the number of cylinders in the engine configuration, engine displacement, engine smoothness or NVH requirements, exhaust catalyst or emission after-treatment device conditions, desired VDE switching frequency and cylinder reactivation issues. For example, based on the various factors, the deactivation may include deactivating 2 cylinders per bank on a V8 engine, one bank or one cylinder per bank on a V6 engine, 1 or 2 cylinders on an I4 engine or one cylinder on an I3 engine, although other scenarios could be considered. Thus, for example, the engine may be operating with all cylinders combusting and with LP-EGR flowing at a first EGR rate (which is a first percentage of EGR in the intake manifold). Then, during a decrease in engine load, the EGR valve may be closed and one or more cylinders may be deactivated. The engine may then be operated with the EGR valve closed and with the remaining active cylinders combusting until the EGR rate in the intake manifold has dropped from the first EGR rate to a minimum threshold rate.

In one example, the engine may include a first group of cylinders on a first engine bank and a second group of cylinders on a second engine bank. The first group of cylinders may be coupled to a first exhaust catalyst located downstream of the first bank while the second group of cylinders may be coupled to a second exhaust catalyst located downstream of the second bank. In response to the decreasing engine load, all the cylinders of the first bank may be selectively deactivated. The engine may then be operated with the first group of cylinders deactivated and the second group of cylinders activated. In other words, where the engine is a VDE engine, in response to the decreasing engine load, the engine may be transitioned from a non-VDE mode (with all cylinders combusting) to a VDE mode (with half the cylinders combusting).

The engine may continue to be operated with the one or more cylinders deactivated until EGR is sufficiently purged from the engine. As such, during the decreasing engine load, airflow to the engine may be decreased and correspondingly, LP-EGR to the engine may also be decreased. However, due to a large transport delay between the LP-EGR valve and the combustion chamber, EGR may not be decreased as fast as required, in particular in the air induction system from the EGR outlet to the compressor inlet. Specifically, since the LP-EGR passage takes off exhaust gas after the turbine and injects exhaust gas before the compressor, there is a large delay in purging of the EGR from the air intake system. The delay is exacerbated by the presence of a large boosted volume (e.g., up to six times the engine displacement volume) in some engine configurations. The delay in purging leads to combustion stability risks. For example, the presence of more dilution than required in the air induction system can increase the likelihood of misfires.

The adoption of the flat EGR schedule, wherein the EGR rate is kept constant relative to airflow, helps in alleviating some of the issues associated with the delayed purging. However, the use of a flat schedule results in operating LP-EGR at some lower load points where no fuel economy benefit is achieved. In fact, in some lower engine speed-load points, operating LP-EGR results in a fuel penalty. In addition, the compressor may be exposed to EGR at the low load conditions, necessitating corrosion and condensation countermeasures. As EGR flows through the charge air cooler, additional condensation may arise that may also need to be addressed. At some low load conditions, a low pressure air intake throttle may also need to be operated to drive the EGR flow. Furthermore, the lower load points limit the flat EGR schedule at higher load points as these are the points where the combustion system is the most dilution (EGR) limited. For example, the flat schedule limits the peak EGR rate achievable at higher engine speed-load conditions. As such, this limits the fuel economy benefit of LP-EGR.

The inventors herein have recognized that purging of LP-EGR from the air induction system can be expedited by selectively deactivating one or more engine cylinders. Specifically, by deactivating some cylinders and operating the remaining cylinders at a higher effective cylinder load, the dilution tolerance of the cylinder is improved. That is, the higher load operation of the cylinder allows for operation in the presence of higher EGR amounts (that are lingering due to the transport delay in purging EGR) with reduced risk of misfire, combustion instability, and slow burn issues.

At 416, it may be determined if the EGR has been sufficiently purged from the engine air induction system. For example, it may be determined if EGR (flow, amount, concentration, etc.) in the intake is lower than a threshold. In one example, an intake oxygen sensor may be used to estimate the concentration of EGR in the intake. Therein, an increase in intake oxygen concentration may be used to infer a decrease in EGR dilution delivery.

The EGR threshold may be based on the engine load, the threshold decreased as the engine load decreases. The EGR threshold may be further based on a number of cylinders that are deactivated and an EGR tolerance of the active cylinders at the low engine load conditions. For example, as the number of cylinders that are deactivated increases and the EGR tolerance of the remaining active cylinders increases, the threshold may be increased.

If the EGR has not been sufficiently purged and the EGR level is still above the threshold, then at 417, the engine may continue to be operated with the one or more cylinders deactivated. If the EGR has been sufficiently purged and the EGR level is below the threshold, then at 418, the routine includes determining if the engine load is still low or in there is a further drop in engine load.

If after EGR is below the threshold, no further drop in engine load is confirmed at 418, the routine proceeds directly to 427 where the routine includes reactivating the one or more deactivated cylinders. For example, the fuel injectors of the deactivated cylinders may be reactivated and cylinder fueling may be re-enabled. In addition, EGR may be re-enabled. For example, an LP-EGR valve may be opened and EGR may be provided at an optimal LP-EGR rate relative to engine speed/load conditions. In one example, LP-EGR may be provided as per a flat schedule, with EGR adjusted to be at a fixed rate relative to airflow.

From 427, the routine proceeds to 428 where during cylinder reactivation, an exhaust catalyst (e.g., a three-way catalyst) may be purged. Catalyst purging includes adjusting a fuel of the previously deactivated engine cylinders so as to reduce the oxygen saturation of an exhaust catalyst coupled downstream of the deactivated engine cylinders. For example, in embodiments where a first engine bank is selectively deactivated at 414 while a second engine bank continues combusting, catalyst purging may include, during reactivation of the first bank, adjusting a fueling of the first bank so as to reduce the oxygen saturation of a first exhaust catalyst coupled to the first bank (and not the second engine bank). As such, during operation in the VDE mode, due to operation of the intake and exhaust valves, air may have been pumped through the first exhaust catalyst, causing catalyst oxygen saturation with a resulting drop in catalyst efficiency. Thus, during the reactivation, the catalyst may need to be purged or regenerated. As discussed with reference to the example of FIGS. 6-7, during the reactivation, the first bank may be operated richer than stoichiometry for a duration, while the second bank is operated at stoichiometry, until the first exhaust catalyst is sufficiently regenerated. A degree of richness and/or a duration of the purging may be adjusted based on the degree of catalyst purging required, which is based on the duration of operation in the VDE mode during the immediately preceding bank deactivation (at 414). Herein, the exhaust catalyst may be a three-way catalyst. In alternate examples, such as where the first exhaust catalyst is an SCR catalyst or a reduction catalyst, the exhaust catalyst may be purged by increasing injection of reductant from a reductant injector located upstream of the first exhaust catalyst in the exhaust manifold.

While the above example details exhaust catalyst purging in engine embodiments where the first group of cylinders is coupled to a first exhaust catalyst and the second group of cylinders is coupled to a second exhaust catalyst, the exhaust manifold branching upstream of first and second exhaust catalysts and recombining at a location downstream of each of the first and second exhaust catalysts, in alternate embodiments, such as where the first group of cylinders and the second group of cylinders are coupled to a common exhaust catalyst, or where the banks are coupled to respective exhaust catalysts but the exhaust manifold is combined at a location upstream of the first and second exhaust catalyst, catalyst purging may not be required. Alternatively, less purging may be required. This may be due to the exposure of the exhaust catalyst to stoichiometric exhaust from the second active group of cylinders during engine operation.

Returning to 418, if a drop in engine load is confirmed, then at 420, it may be determined if the drop in engine load includes a tip-out to zero load conditions. If yes, then after EGR is below the threshold (that is sufficiently purged), in response to drop in engine load to zero load conditions, at 422, the routine includes shutting off fuel to all engine cylinders while maintaining intake valve and exhaust valve operation of all the engine cylinders. For example, in response to the drop in engine load after EGR has been sufficiently purged, the engine may be automatically moved into a deceleration fuel shut off (DFSO) mode of operation. The engine may then remain in the DFSO mode with fueling disabled to all engine cylinders until engine load increases.

If at tip-out to zero load is not confirmed at 420, then a drop in engine load to low load conditions is determined and at 424, the selectively deactivated engine cylinders are maintained deactivated and EGR is maintained disabled. For example, the VDE mode of engine operation is continued with the LP-EGR valve closed. The engine may then remain in the VDE mode with the one or more cylinders selectively deactivated and EGR disabled until there is an increase in engine load.

At 425, it may be determined if there is an increase in engine load. For example, it may be determined if there is a tip-in. If an increase in engine load is not confirmed, then at 426, the routine includes maintaining engine operation in the existing operating mode. For example, the engine may continue to be operated in the DFSO mode with all fueling of all engine cylinders deactivated and EGR disabled (at 422) or in the VDE mode with fueling of selected engine cylinders deactivated and EGR disabled (at 424).

If an increase in engine load is confirmed, the routine proceeds to 427 to reactivate the previously deactivated engine cylinders and re-enable EGR. For example, in response to an increase in engine load while the engine is in the DFSO mode, the routine includes exiting the DFSO mode by re-enabling fueling to all engine cylinders and resuming combustion in all engine cylinders. In addition, the LP-EGR valve may be opened to allow for exhaust gas recirculation (e.g., as per a flat schedule). As another example, in response to an increase in engine load while the engine is in the VDE mode, the routine includes exiting the VDE mode by re-enabling fueling to the selectively deactivated engine cylinders, resuming cylinder intake and exhaust valve operation, and resuming combustion in all engine cylinders. In addition, the LP-EGR valve may be opened to allow for exhaust gas recirculation (e.g., as per a flat schedule). The routine then proceeds to 428 to purge exhaust catalysts during the reactivation, as discussed above.

In one example, during reactivation following a DFSO event, each of the first and second exhaust catalyst may be purged in embodiments where each of the first and second group of cylinders are coupled to respective downstream exhaust catalysts. Alternatively, if the engine is configured with a common exhaust catalyst, catalyst purging may be required following a DFSO event.

In this way, by deactivating some engine cylinders and increasing an average cylinder load of remaining active cylinders during conditions when EGR levels are higher than desired, high dilution tolerance of cylinders at low loads can be improved.

Now turning to FIG. 5, an example cylinder deactivation routine 500 is shown for expediting low pressure EGR purging from an engine induction system.

At 502, as at 402, engine operating conditions may be estimated and/or measured. At 504, as at 404, a target EGR rate may be determined based on the estimated operating conditions. For example, a target LP-EGR rate may be determined. At 506, as at 406, an LP-EGR valve opening may be adjusted based on the target EGR rate to provide the desired EGR. For example, an LP-EGR valve opening may be increased at mid to high load conditions to provide the optimal LP-EGR rate relative to engine speed/load conditions (e.g., according to a flat schedule, with EGR provided at a fixed rate relative to airflow).

At 508, it may be determined if an operator pedal tip-out event has occurred. If a tip-out is not confirmed, at 510, EGR control is maintained with EGR continuing to be provided at the fixed rate relative to airflow. If comparison at 512, in response to a tip-out from higher engine load while flowing low pressure EGR, the routine includes deactivating fuel to a first group of engine cylinders on a first engine bank while operating a second group of cylinders on a second engine bank with higher average cylinder load. Additionally, the intake and exhaust valves are closed to isolate the volume on the de-activated bank to effectively reduce the boosted volume and EGR purge times. In one example, where the engine is a variable displacement engine (VDE), the deactivating includes transitioning the engine from operating in a non-VDE mode (with all cylinders combusting) to operating in a VDE mode (with half the engine cylinders combusting).

As discussed at FIG. 4 (specifically at 414), a number of cylinders that are deactivated responsive to the decreasing engine load may be adjusted based on various parameters such as the number of cylinders in the engine configuration, engine displacement, engine smoothness or NVH requirements, exhaust catalyst or emission after-treatment device conditions, desired VDE switching frequency and cylinder reactivation issues.

Also, at 514, the routine includes disabling EGR, such as by closing an LP-EGR valve in an LP-EGR passage. The engine may continue to be operated with the first group of engine cylinders deactivated and the second group of cylinders active until EGR has been sufficiently purged and the EGR in the air induction system is below a threshold.

It will be appreciated that while the routine of FIG. 5 (as well as FIG. 4) teaches disabling EGR while also deactivating engine cylinders to expedite EGR purging, in alternate examples, the controller may first deactivate the engine cylinders (e.g., in a bank specific manner by operating in a VDE mode) by shutting off fuel and deactivating the intake and exhaust valves on the deactivated cylinders so as to decrease the effective boosted volume and EGR purging time. As discussed previously, by operating the engine in the VDE mode with the EGR valve closed, EGR purging from the engine intake system can be expedited. By deactivating the first group of cylinders while operating the second group of cylinders at a higher average cylinder load, the dilution tolerance of the second group of cylinders at low load and higher than requested EGR levels is improved, without reducing engine torque output. By improving the low load high dilution tolerance of the cylinders, misfires and combustion stability issues are reduced. In addition, the decreased effective boosted volume by deactivating the intake and exhaust valves on the deactivated cylinders expedites replacement of EGR in the induction system with fresh air.

Returning to FIG. 5, at 516, as at 416, it may be determined if EGR is less than the threshold. The threshold may be based on the tip-out from the higher load. An intake oxygen sensor may be used to estimate the concentration of EGR in the intake, for example. Alternatively, a hot film or wire anemometer or a delta pressure orifice or venturi coupled to the EGR passage may be used to estimate the concentration of EGR in the intake.

If the EGR has not been sufficiently purged and the EGR level is still above the threshold, then at 517, as at 417, the engine may continue to be operated in the VDE mode with the first group of cylinders deactivated and with the second group of cylinders operating at higher average cylinder load.

If the EGR has been sufficiently purged and the EGR level is below the threshold, then at 518, the routine includes confirming if there is a further drop in engine load. If after EGR is below the threshold (that is sufficiently purged), no further drop in engine load is confirmed at 518, the routine proceeds directly to 528 wherein the routine includes reactivating the first bank of engine cylinders. This includes resuming fueling to the first engine bank while also re-enabling cylinder intake and exhaust valves. Also at 528, EGR may be re-enabled. For example, the LP-EGR valve may be opened and EGR may be provided at an optimal LP-EGR rate relative to engine speed/ load conditions. In one example, LP-EGR may be provided as per a flat schedule, with EGR adjusted to be at a fixed rate relative to airflow.

Returning to 518, if a drop in engine load is confirmed, then at 520, it may be determined if the drop in engine load includes a tip-out to zero load conditions. If yes, then after EGR is below the threshold (that is sufficiently purged), in response to drop in engine load to zero load conditions, at 522, the routine includes shutting off fuel to all engine cylinders while maintaining intake valve and exhaust valve operation of all the engine cylinders. For example, in response to the drop in engine load after EGR has been sufficiently purged, the engine may be automatically moved into a deceleration fuel shut off (DFSO) mode of operation. The engine may then remain in the DFSO mode with fueling disabled to all engine cylinders until engine load increases.

If at tip-out to zero load is not confirmed at 520, then a drop in engine load to low load conditions is determined and at 524, the routine includes, continuing engine operation in the VDE mode with the first group of cylinders deactivated and with the second group of cylinders operating at higher average cylinder load. That is, after EGR is depleted from the air induction system, the engine may continue to run in the bank shut-off mode (or VDE mode) with EGR disabled until a DFSO mode is entered or there is an increase in engine load. DFSO conditions may be considered met if the torque demand remains below a threshold and the vehicle speed falls below a threshold (such as during vehicle cruising), if a brake pedal is applied and engine braking is requested (such as during a deceleration), or if there is a tip-out to zero load.

At 525, it may be determined if there is an increase in engine load. For example, it may be determined if there is a tip-in. If an increase in engine load is not confirmed, then at 526, the routine includes maintaining engine operation in the existing operating mode. For example, the engine may continue to be operated in the DFSO mode with all fueling of all engine cylinders deactivated and EGR disabled (at 522) or in the VDE mode with fueling of the first engine bank deactivated and EGR disabled (at 524).

If an increase in engine load is confirmed, the routine proceeds to 528 to reactivate the previously deactivated engine cylinders and re-enable EGR. For example, in response to an increase in engine load while the engine is in the DFSO mode, the routine includes exiting the DFSO mode by re-enabling fueling to all engine cylinders and resuming combustion in all engine cylinders. In addition, the LP-EGR valve may be opened to allow for exhaust gas recirculation (e.g., as per a flat schedule). As another example, in response to an increase in engine load while the engine is in the VDE mode, the routine includes exiting the VDE mode by re-enabling fueling to the first bank of engine cylinders, resuming cylinder intake and exhaust valve operation in the first bank of cylinders, and resuming combustion in all engine cylinders. In addition, the LP-EGR valve may be opened to allow for exhaust gas recirculation (e.g., as per a flat schedule). As such, during the reactivation from VDE mode, exhaust catalyst purging on the deactivated cylinder bank may not be required since during the shutdown, exhaust flow for the deactivated cylinder bank is also shutdown. During reactivation from the DFSO mode, the exhaust catalysts on both cylinder banks may need to be purged, as described previously in FIG. 4. Likewise, in examples where following operation in the VDE mode, the engine enters a DFSO mode, during reactivation from the DFSO mode, exhaust catalysts coupled to both groups of cylinders may need to be purged.

In one example, an engine system comprises an engine, a selectively deactivatable fuel injector coupled to a cylinder of the engine, a system for deactivating the intake and exhaust valves of the deactivated cylinders, a turbocharger including an intake compressor driven by an exhaust turbine and an EGR system including a passage for recirculating cooled exhaust residuals from downstream of the turbine to upstream of the compressor. The engine system may further include a controller with computer readable instructions for operating the engine with EGR enabled. Then, in response to decreasing engine load, the controller is configured with further instructions for disabling EGR, deactivating fuel and intake and exhaust valves to a first group of engine cylinders, the first group of engine cylinders selected based on the decreasing engine load and other criteria such as NVH/engine smoothness, desired frequency of VDE switching and cylinder re-activation requirements; and maintaining the number of engine cylinders deactivated until EGR is below a threshold level. The engine system may further comprise an oxygen sensor coupled downstream of the compressor and upstream of an air intake throttle, and the controller may include further instructions for estimating the EGR based on an output of the oxygen sensor. The controller may also be configured to, after EGR is below the threshold level, deactivate fuel to all engine cylinders. In comparison, after EGR is below the threshold level, in response to increasing engine load, the controller may reactivate the first group of engine cylinders and external EGR.

Figure 6:
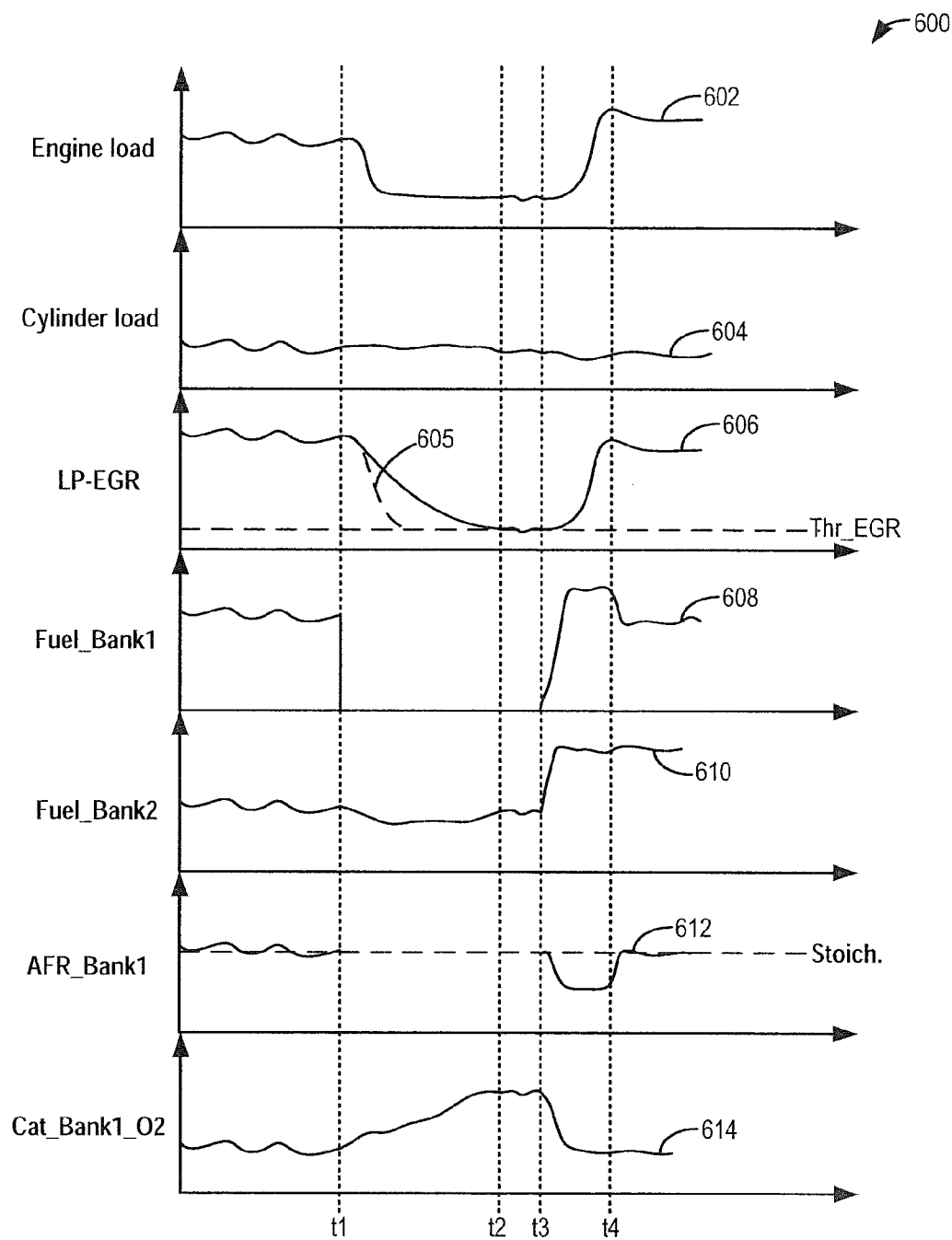
FIGS. 6-7 illustrate example cylinder deactivations that expedite LP-EGR purging from an air induction system.
Figure 7:
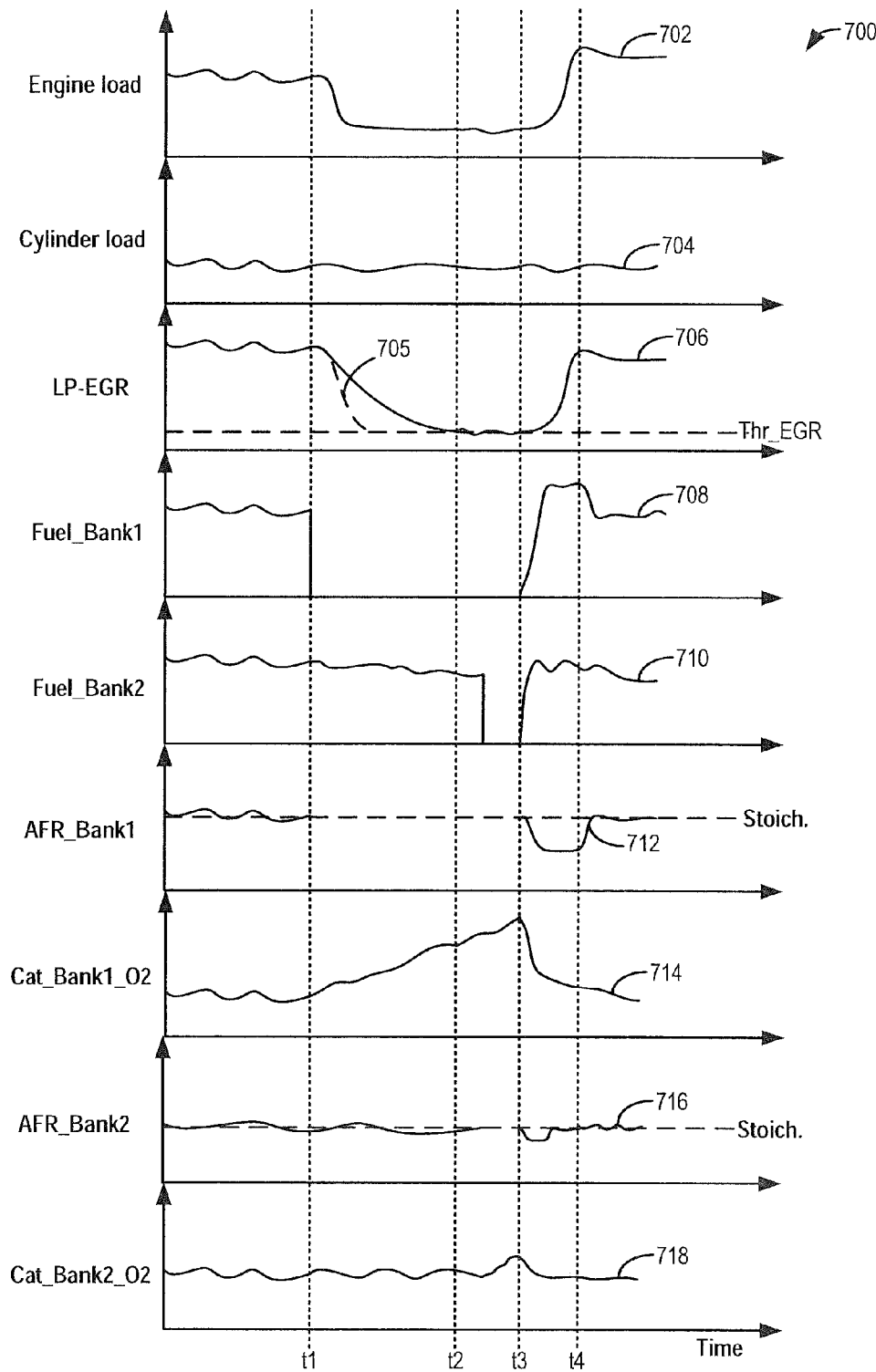

Now turning to FIGS. 6-7, example engine deactivation operations are shown for expediting EGR purging. Map 600 of FIG. 6 depicts change in engine load at plot 602, change in average cylinder load at plot 604, change in LP-EGR amount at plot 606, fueling of a first engine bank at plot 608, fueling of a second engine bank at plot 610, exhaust air-fuel ratio at the first bank at plot 612, and oxygen saturation of an exhaust catalyst coupled downstream of only the first bank at plot 614.

Prior to t1, the engine may be operating at mid to high engine load (plot 602), with cylinders on both a first and second engine bank combusting (plots 608, 610). In particular, both banks may be operating at or around stoichiometry (plot 612). Due to all the cylinders operating to provide engine torque, an average cylinder torque may be lower (plot 604). During the engine operation at mid-high loads, the engine may be operating with LP-EGR flowing (plot 606). In the depicted example, prior to t1, the engine may be operating with a desired LP-EGR schedule, wherein LP-EGR is delivered at the optimal level versus engine speed and load. In addition, due to the flow of stoichiometric exhaust gas through the exhaust catalyst, the oxygen saturation of an exhaust catalyst coupled downstream of the first engine bank (as well as an exhaust catalyst coupled downstream of a second engine bank) may be lower (plot 614).

At t1, an operator pedal tip-out may occur, resulting in a drop in engine load to low load conditions. In response to the decreasing engine load, LP-EGR and airflow may also be decreased. However, due to the transport delay in LP-EGR, the actual decrease in LP-EGR (plot 606, solid line) may be substantially slower than the desired decrease in LP-EGR (as shown by dashed segment 605). Consequently, there may be high dilution in the cylinders at low load conditions, rendering the cylinders prone to misfires and slow burn related issues. To improve the high dilution tolerance of the cylinders, at t1, in response to the decreasing engine load, while LP-EGR is decreased, a VDE mode may be entered and fueling to cylinders on the first engine bank may be selectively disabled, for example, via selectively deactivated fuel injectors. At the same time, fueling of cylinders on the second engine bank may be continued. As a result of a drop in engine load (to about half) and a corresponding deactivation of one bank of engine cylinders, an average cylinder load of the active cylinders may remain roughly constant, even through engine load has dropped, improving their dilution tolerance. However, the increased pumping of fresh air through the first bank increases the oxygen saturation of a first exhaust catalyst coupled downstream of the first bank (but not second bank).

Between t1 and t2, the VDE mode of operation may be maintained while LP-EGR is purged towards Thr_EGR. At t2, LP-EGR may be at the minimum threshold. Herein, by operating the cylinders on the second engine bank with reduced effective boosted volume, EGR purging to the minimum threshold is expedited. As such, if the engine cylinders were not deactivated, LP-EGR would reach the minimum threshold later, for example, substantially after t2.

While LP-EGR is at the minimum threshold at t2, due to engine load remaining low, the VDE mode may be continued. At t3, an operator tip-in is confirmed. In response to the operator tip-in, and the resultant increase in engine load, the engine may exit the VDE mode and reenter a non-VDE mode with fueling to the first bank resumed and with all cylinders combusting. However, due to elevated oxygen saturation of the first exhaust catalyst coupled to the first engine bank, the first exhaust catalyst may need to be purged during reactivation of the first engine bank.

Accordingly, at t3, while reactivating the cylinders of the first engine bank, fueling to the cylinders of the first bank may be adjusted so as to operate the cylinders richer than stoichiometry for a duration until the oxygen saturation of the catalyst is sufficiently reduced (that is, the catalyst is sufficiently purged). At t4, when the first exhaust catalyst is sufficiently purged, fueling of cylinders on the first engine bank may be returned to stoichiometry. As such, while the first exhaust catalyst is purged, combustion at the second engine bank may be maintained at or around stoichiometry.

In this way, by deactivating a bank of engine cylinders and disabling EGR in response to the decreasing load, the active cylinders can be operated with reduced effective boosted volume and EGR purging can be made faster. In particular, EGR purging achieved with one of more engine cylinders deactivated is faster than would be possible if no engine cylinders were deactivated.

Now turning to FIG. 7, another example deactivation is shown. Map 700 of FIG. 6 depicts change in engine load at plot 702, change in average cylinder load at plot 704, change in LP-EGR amount at plot 706, fueling of a first engine bank at plot 708, fueling of a second engine bank at plot 710, exhaust air-fuel ratio at the first bank at plot 712 and at the second bank at plot 716, oxygen saturation of an exhaust catalyst coupled downstream of only the first bank at plot 714, and oxygen saturation of an exhaust catalyst coupled downstream of only the second bank at plot 718.

Prior to t1, the engine may be operating at mid to high engine load (plot 702), with cylinders on both a first and second engine bank combusting (plots 708, 710). In particular, both banks may be operating at or around stoichiometry (plots 712, 716). Due to all the cylinders operating to provide engine torque, an average cylinder torque may be lower (plot 704). During the engine operation at mid-high loads, the engine may be operating with LP-EGR flowing (plot 706). In the depicted example, prior to t1, the engine may be operating with a flat LP-EGR schedule, wherein LP-EGR is delivered at a fixed rate relative to airflow. In addition, due to the flow of stoichiometric exhaust gas through the exhaust catalyst, the oxygen saturation of an exhaust catalyst coupled downstream of the first engine bank as well as an exhaust catalyst coupled downstream of a second engine bank may be lower (plots 714, 718).

At t1, an operator pedal tip-out may occur, resulting in a drop in engine load to low load conditions. In response to the decreasing engine load, LP-EGR and airflow may also be decreased. However, due to the transport delay in LP-EGR, the actual decrease in LP-EGR (plot 706, solid line) may be substantially slower than the desired decrease in LP-EGR (as shown by dashed segment 705). Consequently, there may be high dilution in the cylinders at low load conditions, rendering the cylinders prone to misfires and slow burn related issues. To improve the high dilution tolerance of the cylinders, at t1, in response to the decreasing engine load, while LP-EGR is decreased, a VDE mode may be entered and fueling to cylinders on the first engine bank may be selectively disabled, for example, via selectively deactivatable fuel injectors. At the same time, fueling of cylinders on the second engine bank may be continued. As a result, even though there is a drop in engine load, there may not be a drop in the average cylinder load of the active cylinders, improving their dilution tolerance. In addition, by operating the first bank with fuel deactivated but with intake and/or exhaust valve operation maintained, fresh air may continue to be pumped through the first bank. As such, this increases the replacement of LP-EGR in the air induction system with fresh air, expediting the drop in LP-EGR amount to a minimum threshold Thr_EGR. However, the increased pumping of fresh air through the first bank also increases the oxygen saturation of a first exhaust catalyst coupled downstream of the first bank (but not second bank).

Between t1 and t2, the VDE mode of operation may be maintained while LP-EGR is purged towards Thr_EGR. Herein, by operating the cylinders on the second engine bank with reduced effective boosted volume, EGR purging to the minimum threshold is expedited and achieved by t2. As such, if the engine cylinders were not deactivated, LP-EGR would reach the minimum threshold later, for example, substantially after t2.

At t2, LP-EGR may be at the minimum threshold. However, due to engine load remaining low, the VDE mode may be continued. Between t2 and t3, DFSO conditions may be confirmed and responsive to the DFSO conditions, fueling to the second bank may also be deactivated. Following deactivation of fuel to the second bank, pumping of fresh air through the second bank also increases the oxygen saturation of a second exhaust catalyst coupled downstream of the second bank (but not the first bank). As such, the oxygen saturation incurred at the second exhaust catalyst (between t2 and t3) may be smaller than the oxygen saturation incurred at the first exhaust catalyst (between t1 and t3).

At t3, an operator tip-in is confirmed. In response to the operator tip-in, and the resultant increase in engine load, the engine may exit the DFSO mode and reenter a non-VDE mode with fueling to the first bank and second bank resumed and with all cylinders combusting. However, due to elevated oxygen saturation of the first exhaust catalyst coupled to the first engine bank and the second exhaust catalyst coupled to the second engine bank, each of the first exhaust catalyst and the second exhaust catalyst may need to be purged during reactivation of the first and second engine banks.

Accordingly, at t3, while reactivating the cylinders of the first engine bank, fueling to the cylinders of the first bank may be adjusted so as to operate the cylinders richer than stoichiometry for a first duration d1 until the oxygen saturation of the first exhaust catalyst is sufficiently reduced (that is, the catalyst is sufficiently purged) while fueling to the cylinders of the second bank is also adjusted so as to operate the cylinders richer than stoichiometry for a second duration d2 until the oxygen saturation of the second exhaust catalyst is sufficiently reduced. As shown, first duration d1 may be longer than second duration d2. In addition, the degree of richness required to purge the first exhaust catalyst may be larger than the degree of richness required to purge the second exhaust catalyst.

Between t3 and t4, when the second exhaust catalyst is sufficiently purged, fueling of cylinders on the second engine bank may be returned to stoichiometry. Likewise, at t4, when the first exhaust catalyst is sufficiently purged, fueling of cylinders on the first engine bank may be returned to stoichiometry.

In this way, running of optimal LP EGR rates in mid to higher loads can be achieved while allowing for LP EGR to be purged form the air intake system when there is a tip-out to lower engine loads. By deactivating one or more engine cylinders during low load, higher than desired EGR dilution conditions, the higher average load of the active cylinders can be advantageously used to improve cylinder EGR tolerance and combustion stability. If the intake and exhaust valves are also deactivated on the deactivated cylinders, effective boosted volume can also be reduced and EGR purging is improved. By expediting EGR purging, combustion stability issues and misfire events are reduced. In addition, condensation and related issues are reduced. Furthermore, higher EGR rates can be achieved during subsequent high load engine operations. Overall, boosted engine performance is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, V-8, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   operating an engine with all cylinders combusting while flowing low pressure EGR; and
   responsive to decreasing engine load,
      disabling EGR;
      increasing an EGR tolerance of the engine by operating the engine with one or more cylinders deactivated; and
      maintaining the one or more cylinders deactivated until an EGR concentration is below a threshold.

2. The method of claim 1, wherein disabling EGR includes closing an EGR valve coupled in a LP-EGR passage and purging the LP-EGR passage to the engine, the passage delivering exhaust residuals from an exhaust manifold, downstream of an exhaust turbine to an intake manifold, upstream of an intake compressor.

3. The method of claim 2, wherein a number of cylinders deactivated is based on one or more of engine load, noise, vibration, and harshness (NVH), desired cylinder switching frequency, exhaust catalyst conditions, and emission aftertreatment conditions.

4. The method of claim 3, wherein the threshold is based on the engine load, the threshold decreasing as the engine load decreases.

5. The method of claim 4, wherein, responsive to decreasing engine load, maintaining one or more cylinders active, and
   wherein decreasing engine load includes engine load decreasing below a threshold load, the method further comprising, after the EGR concentration is below the threshold, in response to engine load remaining below the threshold load, shutting off fuel to all engine cylinders while maintaining intake valve and exhaust valve operation of all engine cylinders until engine load increases above the threshold load.

6. The method of claim 5, further comprising, after the EGR concentration is below the threshold, in response to engine load increasing above the threshold load, reactivating the one or more deactivated cylinders and reactivating EGR.

7. The method of claim 6, wherein the engine includes a first group of cylinders on a first engine bank and a second group of cylinders on a second engine bank, and wherein operating the engine with one or more cylinders deactivated includes operating the engine with the first group of cylinders deactivated and the second group of cylinders activated.

8. The method of claim 7, wherein the first group of cylinders is coupled to a first exhaust catalyst and the second group of cylinders is coupled to a second exhaust catalyst, the method further comprising, during cylinder reactivation, purging the first exhaust catalyst and not the second exhaust catalyst.

9. The method of claim 1, wherein operating with one or more cylinders deactivated includes increasing an average cylinder load of the activated cylinders, increasing an EGR tolerance of the activated cylinders, and selectively disabling fuel to the one or more cylinders or selectively deactivating intake and exhaust valves of the one or more cylinders.

10. The method of claim 1, wherein the decreasing engine load is responsive to an operator pedal tip-out; and
   maintaining the one or more cylinders deactivated until the EGR concentration is below the threshold includes purging an EGR line.

11. The method of claim 2, further comprising, estimating the EGR concentration based on output of an intake oxygen sensor coupled downstream of the intake compressor and upstream of an intake throttle.

12. A method for an engine comprising:
in response to a tip-out from higher engine load while flowing low pressure EGR,
disabling EGR; and
deactivating fuel to a first group of engine cylinders while operating a second group of engine cylinders with higher average cylinder load until EGR is below a threshold, wherein operating the second group of engine cylinders with higher average cylinder load includes operating with reduced effective boosted volume and faster EGR purging, the method further comprising, after EGR is below the threshold, selectively purging a first exhaust catalyst coupled downstream of the first group of cylinders but not the second group of cylinders.

13. The method of claim 12, further comprising, after EGR is below the threshold, in response to a tip-in to higher load, reactivating the first group of engine cylinders and EGR, and in response to a continuing tip-out to zero load, deactivating fuel to the second group of cylinders while maintaining the first group of cylinders with fuel deactivated.

14. The method of claim 12, wherein the threshold is based on the tip-out from higher load.

15. An engine system, comprising:
an engine;
a selectively deactivatable fuel injector coupled to a cylinder of the engine;
a turbocharger including an intake compressor driven by an exhaust turbine;
an EGR system including a passage for recirculating cooled exhaust residuals from downstream of the turbine to upstream of the compressor; and
a controller with computer readable instructions for:
operating the engine with EGR enabled; and
in response to decreasing engine load,
disabling EGR;
deactivating fuel to a first group of engine cylinders, the first group of engine cylinders selected based on the decreasing engine load, and further based on engine NVH, cylinder deactivation frequency and cylinder reactivation requirements; and
maintaining the first group of engine cylinders deactivated until EGR is below a threshold level.

16. The system of claim 15, further comprising an oxygen sensor coupled downstream of the compressor and upstream of an air intake throttle, wherein the controller includes further instructions for estimating EGR based on an output of the oxygen sensor.

17. The system of claim 15, wherein the controller includes further instructions for, after EGR is below the threshold level, and engine load is at zero, deactivating fuel to all engine cylinders while continuing to operate an intake valve and an exhaust valve of all the engine cylinders.

18. The system of claim 15, wherein the controller includes further instructions for, after EGR is below the threshold level, in response to increasing engine load, reactivating the first group of engine cylinders and EGR.

19. The system of claim 18, wherein the first group of engine cylinders is located on a first bank of the engine, and wherein the controller includes further instructions for, during reactivation of the first group of cylinders, adjusting fuel injection to the first group of cylinders to purge a first exhaust catalyst coupled downstream of the first group of cylinders.

20. The method of claim 1, wherein, responsive to decreasing engine load, one or more remaining active cylinders are operated at a higher average cylinder load until the EGR concentration is below the threshold, and
responsive to engine load decreasing to zero load, deactivating fuel to all engine cylinders while maintaining valve operation.

* * * * *